US007209180B2

(12) United States Patent
Takagi et al.

(10) Patent No.: US 7,209,180 B2
(45) Date of Patent: Apr. 24, 2007

(54) VIDEO OUTPUT DEVICE

(75) Inventors: Toshihiro Takagi, Osaka (JP); Tatsuo Miyagawa, Osaka (JP); Yasuhiro Inui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 522 days.

(21) Appl. No.: 10/699,300

(22) Filed: Oct. 31, 2003

(65) Prior Publication Data

US 2004/0100584 A1    May 27, 2004

(30) Foreign Application Priority Data

Nov. 6, 2002    (JP)    ............................ P2002-322662

(51) Int. Cl.
H04N 5/00 (2006.01)
H04N 5/14 (2006.01)
H04N 5/46 (2006.01)
H04N 5/57 (2006.01)
H04N 7/01 (2006.01)
H04N 11/20 (2006.01)

(52) U.S. Cl. ...................... 348/558; 348/445; 348/556; 348/557; 348/615; 348/673; 348/687

(58) Field of Classification Search ........ 348/556–558, 348/445, 615, 673, 687
See application file for complete search history.

(56) References Cited

U.S. PATENT DOCUMENTS 5,748,257 A * 5/1998 Kawabata et al. .......... 348/615
5,784,123 A * 7/1998 Yoshimi ..................... 348/556
6,323,915 B1 * 11/2001 Marflak et al. ............. 348/704
6,366,706 B1 * 4/2002 Weitbruch .................. 382/254
6,369,851 B1 * 4/2002 Marflak et al. ............. 348/173
6,690,425 B1 * 2/2004 Worrell ...................... 348/445
6,947,097 B1 * 9/2005 Joanblanq ................... 348/558
6,965,415 B2 * 11/2005 Lundblad et al. ........... 348/556

FOREIGN PATENT DOCUMENTS

| JP | 8-211860 | 8/1996 |
| JP | 2713677 | 10/1997 |
| JP | 2001-175212 | 6/2001 |

OTHER PUBLICATIONS

Japanese Office Action for Japanese patent application 2002-322662, issued Dec. 16, 2004, and English translation thereof, 4 pages.
Patent Abstracts of Japan, Publication No.: 2001-175212, Publication date Jun. 29, 2001, 1 page.

* cited by examiner

*Primary Examiner*—Brian P. Yenke
(74) *Attorney, Agent, or Firm*—Osha Liang LLP

(57) ABSTRACT

A video output device adds a blank on both left and right sides or both upper and lower sides of an input video to produce a video having the same aspect ratio as that of the display screen of the display device, when an aspect ratio of the input video and an aspect ratio of a display device for displaying the video are different. At this time, the brightness of the blank to be added to the input video is adjusted in accordance with the brightness near the boundary between the input video and the blank to suppress a difference in brightness near the boundary.

5 Claims, 9 Drawing Sheets

RANGE FOR DETECTING AVERAGE OF BRIGHTNESS

BLANK         BLANK

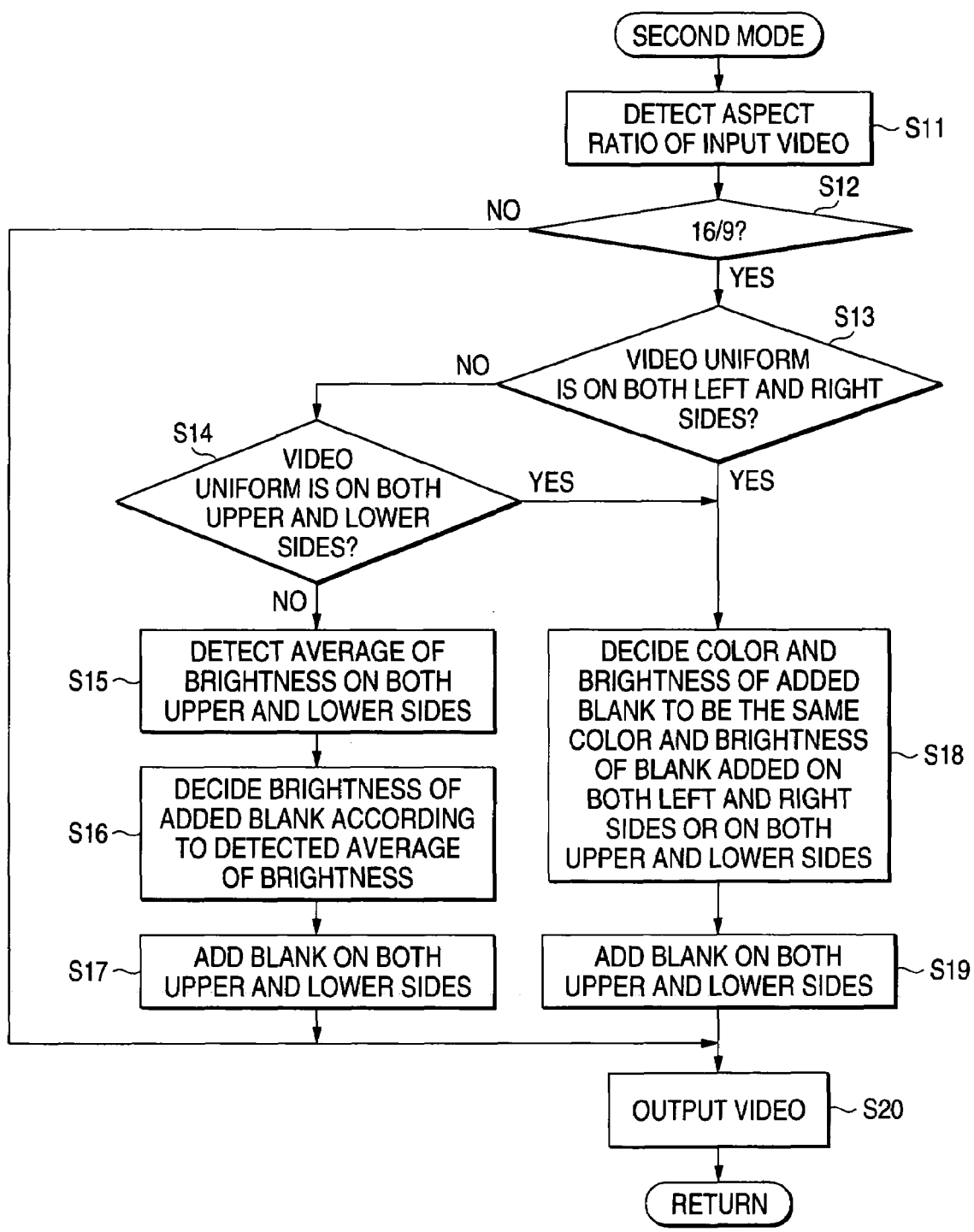

RANGE FOR DETECTING AVERAGE OF BRIGHTNESS

RANGE FOR DETECTING AVERAGE OF BRIGHTNESS

BLANK

BLANK

VIDEO OUTPUT DEVICE

BACKGROUND OF THE INVENTION

1. Field of the Invention

The present invention relates to a video output device for adding the blank on both left and right sides or on both upper and lower sides of an input video and outputting the video having a changed aspect ratio.

2. Description of the Related Art

Conventionally, in a television broadcasting, a program is broadcast with a video having an aspect ratio of 4/3, or 16/9. Also, the video having an aspect ratio of 16/9 may include the video of Cinemascope size having an aspect ratio of 2.35/1 with the blank added on both upper and lower sides, and the video having an aspect ratio of 4/3 with the blank added on both left and right sides. On the contrary, the video having an aspect ratio of 4/3 may include the video having an aspect ratio of 16/9 with the blank added on both upper and lower sides.

The "blank" as referred to herein corresponds to a uniform video area such as an video area having single color of black or gray.

Conventionally, a so-called wide-screen television set in which the display screen has an aspect ratio of 16/9 has also been widespread. Some wide-screen television sets has video output device for adding the blank of appropriate size on both left and right sides of the video if the aspect ratio of input video is 4/3, and outputting the video having an aspect ratio of 16/9. Also, there is a video output device for outputting the video having an aspect ratio of 4/3 into a display screen having an aspect ratio of 4/3 for the television receiver in which the video (input video) having an aspect ratio of 16/9 has the blank added on both upper and lower sides to produce the video (output video) having an aspect ratio of 4/3. The video output device inputs not only a television broadcast signal but also a reproducing video signal output from another device such as a DVD unit or a video deck as the input video (with a so-called external input terminal).

Employing the video output device, it is possible to prevent the video from being distorted on the display screen by expanding the input video in the transverse or longitudinal direction when the aspect ratio of the display screen and the aspect ratio of input video are different. More specifically, it is possible to prevent the input video having an aspect ratio of 4/3 from being expanded in the transverse direction to produce the video having an aspect ratio of 16/9 in the device with the display screen having an aspect ratio of 16/9, or conversely, to prevent the input video having an aspect ratio of 16/9 from being expanded in the longitudinal direction to produce the video having an aspect ratio of 4/3 in the device with the display screen having an aspect ratio of 4/3.

In the conventional video output device, the brightness or color of the blank to be added on both left and right sides or both left and right sides of the input video was preset, and the blank having the preset brightness or color was added on both left and right sides or both upper and lower sides of the input video. In this manner, since the blank having the brightness or color that was preset irrespective of the input video (video to add the blank) was added on both left and right sides or both upper and lower sides of the input video, there was a great difference in the brightness near a boundary between the added blank and the input video, resulting in a problem that the video was distorted near this boundary. Also, when the input video had the blank added as described above, there was a problem that the blank in brightness or color different from the blank originally added to the input video was added to the input video to produce the unnatural video on the display screen.

Incidentally, in displaying the first image and the second image adjacently, a technique for adjusting the hue in the boundary portion to prevent the distortion of video in the boundary portion has already been proposed (See JP-A-2713677 and JP-A-8-211860).

However, in the above video output devices for adding the blank on both left and right sides or both upper and lower sides of the input video and outputting the video (output video) having a changed aspect ratio, there was no video output device for preventing a distortion of video from occurring near the boundary between the input video and the added blank, or prevent an unnatural video with the blank in brightness or color that is different from the blank originally added to the input video from being displayed.

SUMMARY OF THE INVENTION

It is therefore an object of the invention to provide a video output device for producing an output video having a changed aspect ratio by adding the blank on both left and right sides or both upper and lower sides of the input video, in which a distortion near the boundary between the input video and the added blank is prevented.

Also, it is another object of the invention to provide a video output device for producing an output video having a changed aspect ratio by adding the blank on both left and right sides or both upper and lower sides of the input video, in which an unnatural video is prevented from being displayed by adding the blank having the same color or brightness as the blank originally added to the input video.

In order to achieve the object, according to a first aspect of the invention, there is provided a video output device including: an aspect ratio detecting unit configured to detect an aspect ratio of a input video; a first blank adding unit configured to add a blank on both left and right sides of the video to produce a video having an aspect ratio of 16/9, in a case where the aspect ratio detected by the aspect ratio detecting unit is 4/3; a second blank adding unit configured to add a blank on both upper and lower sides of the video to produce a video having an aspect ratio of 4/3, in a case where the aspect ratio detected by the aspect ratio detecting unit is 16/9; a setting unit configured to enable one of the first and the second blank adding units and to disable the other; an output unit configured to output the video having a changed aspect ratio produced by either one of the first and the second blank adding units enabled by the setting unit; a blank video detecting unit configured to detect whether or not a predetermined range on both left and right sides of the input video is uniform, and to detect whether or not a predetermined range on both upper and lower sides of the input video is uniform; and a brightness detecting unit configured to detect a brightness of a predetermined range on both left and right sides of the input video, and to detect a brightness of a predetermined range on both upper and lower sides of the input video, wherein when the blank video detecting unit detects that the predetermined range of the input video on both left and right sides, or on both upper and lower sides, is uniform, the first and the second blank adding unit adjust a brightness and a color of the blank to be added so as to coincide with the brightness and a color of the predetermined range of the input video, and wherein when the blank video detecting unit detects that the predetermined range of the input video on both left and right sides, and on both upper and lower sides, is not uniform, the first blank adding unit adjusts the brightness of the blank to be added in accordance with the brightness of the predetermined range of the input video on both left and right sides, and the second blank adding unit adjusts the brightness of the blank to be added in accordance with the brightness of the predetermined range of the input video on both upper and lower sides.

According to a second aspect of the invention, there is provided a video output device including: an aspect ratio detecting unit configured to detect an aspect ratio of a input video; a blank adding unit configured to add a blank on both left and right sides of the video to produce a video having an aspect ratio of 16/9, in a case where the aspect ratio detected by the aspect ratio detecting unit is 4/3; an output unit configured to output the video having the aspect ratio of 16/9 in which produced by the blank adding unit; and a brightness detecting unit configured to detect a brightness of a predetermined range on both left and right sides of the input video, wherein the blank adding unit adjusts a brightness of the blank to be added in accordance with the brightness detected by the brightness detecting unit.

According to a third aspect of the invention, there is provided a video output device including: an aspect ratio detecting unit configured to detect an aspect ratio of a input video; a blank adding unit configured to add a blank on both upper and lower sides of the video to produce a video having an aspect ratio of 4/3, in a case where the aspect ratio detected by the aspect ratio detecting unit is 16/9; an output unit configured to output the video having the aspect ratio of 4/3 in which produced by the blank adding unit; and a brightness detecting unit configured to detect a brightness of a predetermined range on both upper and lower sides of the input video, wherein the blank adding unit adjusts a brightness of the blank to be added in accordance with the brightness detected by the brightness detecting unit.

BRIEF DESCRIPTION OF THE DRAWINGS

The above objects and advantages of the present invention will become more apparent by describing a preferred exemplary embodiment thereof in detail with reference to the accompanying drawings, wherein:

FIG. 7 is a flowchart showing the operation in a second mode of the video output device according to the embodiment of the invention;

DETAILED DESCRIPTION OF THE PREFERRED EMBODIMENTS

Referring now to the accompanying drawings, a description will be given in detail of a preferred embodiment of the invention.

A video output device according to an embodiment of the present invention will be described below.

Figure 1:
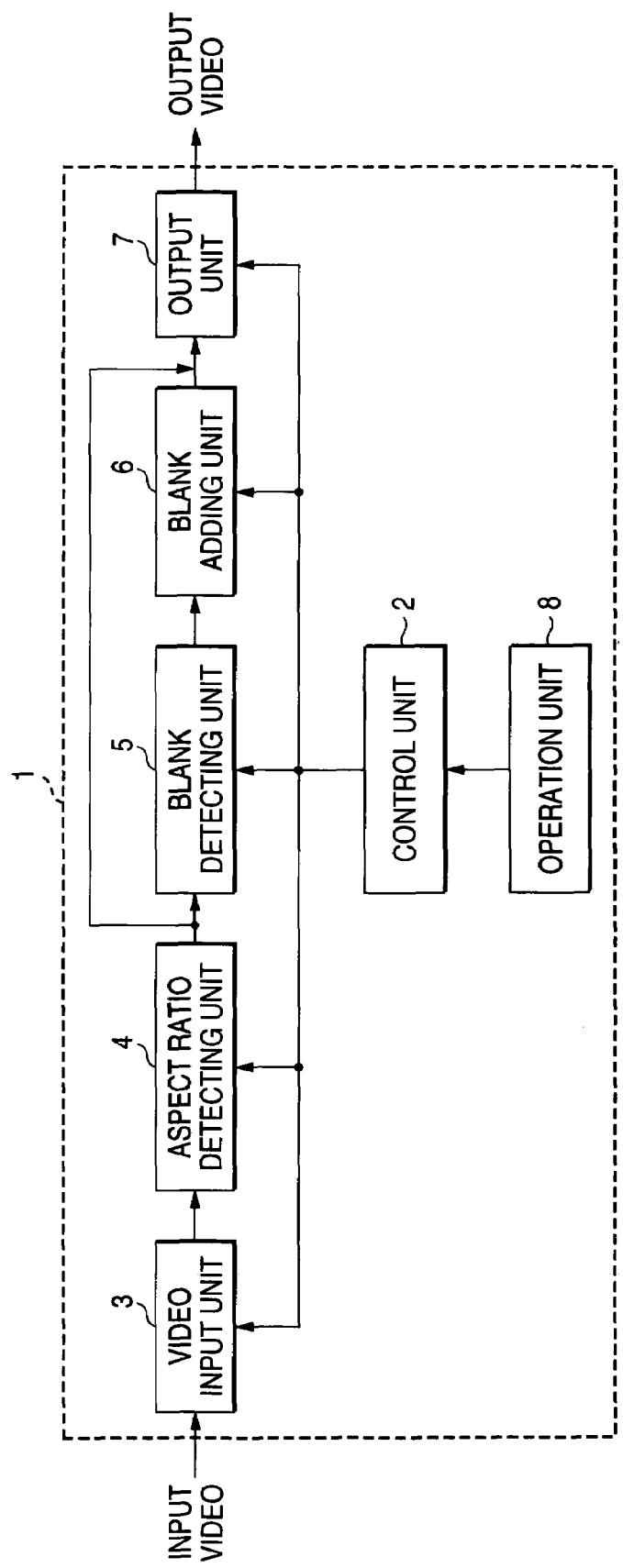
FIG. 1 is a block diagram showing a functional configuration of a video output device according to an embodiment of the present invention.

FIG. 1 is a block diagram showing a functional configuration of the video output device according to the embodiment. The video output device 1 includes a control unit 2 for controlling the operation of the video output device 1, a video input unit 3 for accepting the input of a video (input video), an aspect ratio detecting unit 4 for detecting the aspect ratio of the input video input into the video input unit 3, a blank detecting unit 5 for detecting the brightness and color in a predetermined range on both upper and lower sides or on both left and right sides of the input video, a blank adding unit 6 for adding the blank on both left and right sides or both upper and lower sides of the input video, an output unit 7 for outputting the video (output video), and an operation unit 8 for enabling input operation by a user. In the video output device 1, the video to be output (the output video) is selected from among a raw video that corresponds to the input video, a video having the blank added on both left and right sides of the input video, or the video having the blank added on both upper and lower sides of the input video.

The video input unit 3 has a tuner function for extracting the television broadcast signals on a selected channel from the television broadcast signals received at an antenna (not shown), a decoder function for decoding a video signal compressed by an MPEG method, and an A/D conversion function for converting an input analog video signal into a digital signal. The video signal input into the video input unit 3 is not limited to the television broadcast signal, but may be a reproducing video signal output from a DVD player or a video cartridge recorder (VCR) or other kinds of video signal. Also, the input video signal may be a signal including a moving image or a signal including a still image.

The aspect ratio detecting unit 4 detects the aspect ratio of the input video. The blank detecting unit 5 detects whether or not the blank is added on both left and right sides or both upper and lower sides of the input video, as well as detecting the brightness on both left and right sides or both upper and lower sides. The blank detecting unit 5 corresponds to blank video detecting unit and brightness detecting unit as referred to in the present invention. The blank adding unit 6 adds the blank on both left and right sides or both upper an d lower sides of the input video, and adjusts the color and brightness of the added blank. The output unit 7 has a D/A conversion function for converting a digital video signal into an analog video signal. A device having a display screen such as a television receiver is connected to the output unit 7. The operation unit 8 is provided with the keys for enabling the input operation into the main body and a receiving circuit for receiving a control code sent from a remote controller, not shown.

The operation of the video output device 1 will be described hereinbelow. The video output device 1 operates in either a first mode that is preferred when the aspect ratio of the display screen in the device connected to the output unit 7 is 16/9 or a second mode that is preferred when the aspect ratio of the display screen in the device connected to the output unit 7 is 4/3. The user selects one of the first mode and the second mode by making a predetermined operation on the operation unit 8. Herein, a description will be made for a configuration that the first mode is selected when the aspect ratio of the display screen for the device connected to the output unit 7 is 16/9, and the second mode is selected when the aspect ratio of the display screen for the device connected to the output unit 7 is 4/3.

Figure 2:
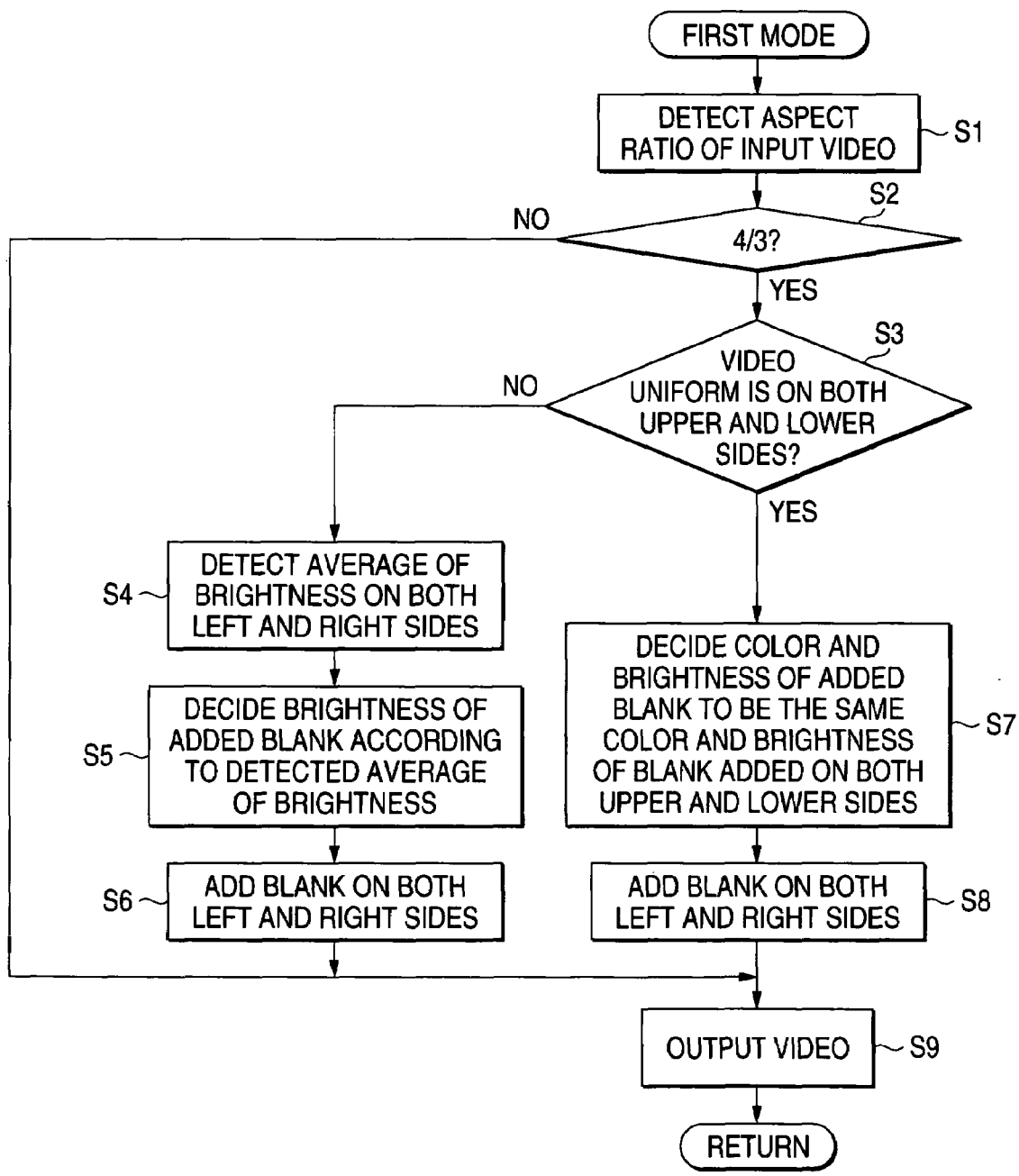
FIG. 2 is a flowchart showing the operation in a first mode of the video output device according to the embodiment.

Referring firstly to FIG. 2, the first mode will be described hereinbelow. FIG. 2 is a flowchart showing the operation of the video output device when the first mode is selected.

The video output device 1 detects the aspect ratio of the input video input into the video input unit 3 in the aspect ratio detecting unit 4 (S1). The video output unit 1 determines whether the aspect ratio detected at step S1 is 4/3 or 16/9 (S2). If the video output unit 1 determines that the aspect ratio of the input video is 16/9 at step S2, the input video is output as the output video from the output unit 7 without intervention of the blank detecting unit 5 and the blank adding unit 6 (S9).

In the case where the input video is output without intervention of the blank detecting unit 5, the aspect ratio of the output video is 16/9, which is the same as that of the input video. Since the output unit 7 is connected to the display device in which the aspect ratio of the display screen is 16/9, the output video output from the output unit 7 is not expanded in the transverse direction or longitudinal direction in display. Therefore, there is no distortion in the displayed video. Also, even though the input video input into the video input unit 3 is the video with the blank added on both left and right sides or both upper and lower sides, the output video is not displayed expanded in the transverse or longitudinal direction, and there is no distortion in the displayed video.

Figure 3A:
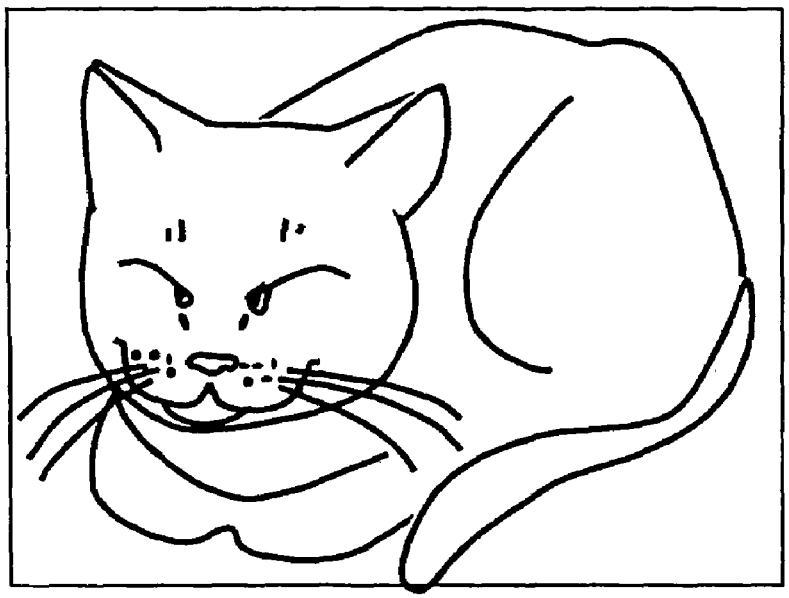
FIGS. 3A and 3B are views showing an example of the input video having an aspect ratio of 4/3.
Figure 3B:
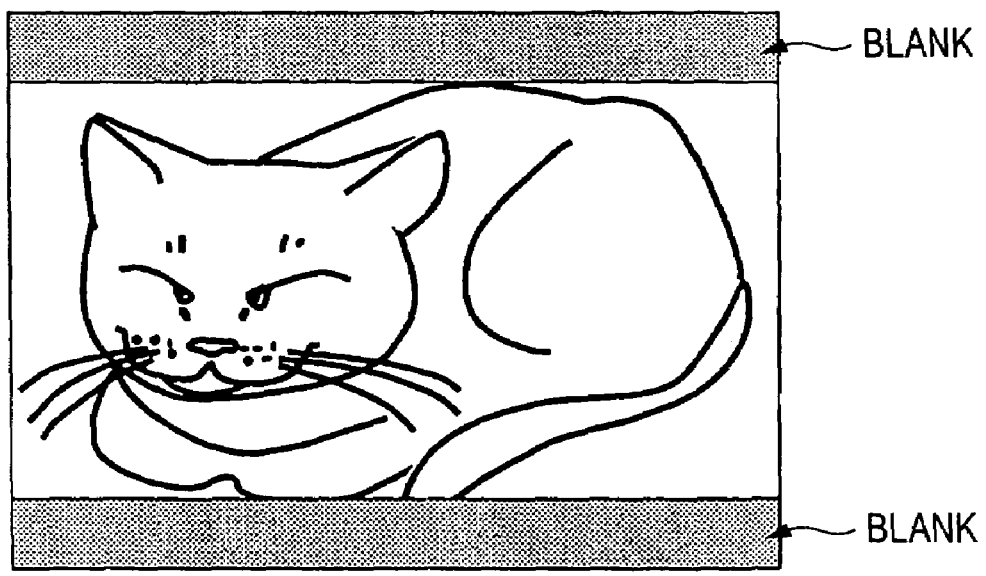

On the other hand, in a case where determined that the aspect ratio of the input video is 4/3 at step S2, the blank detecting unit 5 determines whether the input video is uniform in a predetermined range on both upper and lower sides of the input video (S3). At step S3, it is determined whether the input video is the video without the blank added on both upper and lower sides (see FIG. 3A), or the video with the blank added on both upper and lower sides (see FIG. 3B). That is, it is determined whether or not the input video is the video having an aspect ratio of 4/3 with the blank added on both upper and lower sides of the video having an aspect ratio of 16/9 or 2.35/1, as shown in FIG. 3B.

Figure 4A:
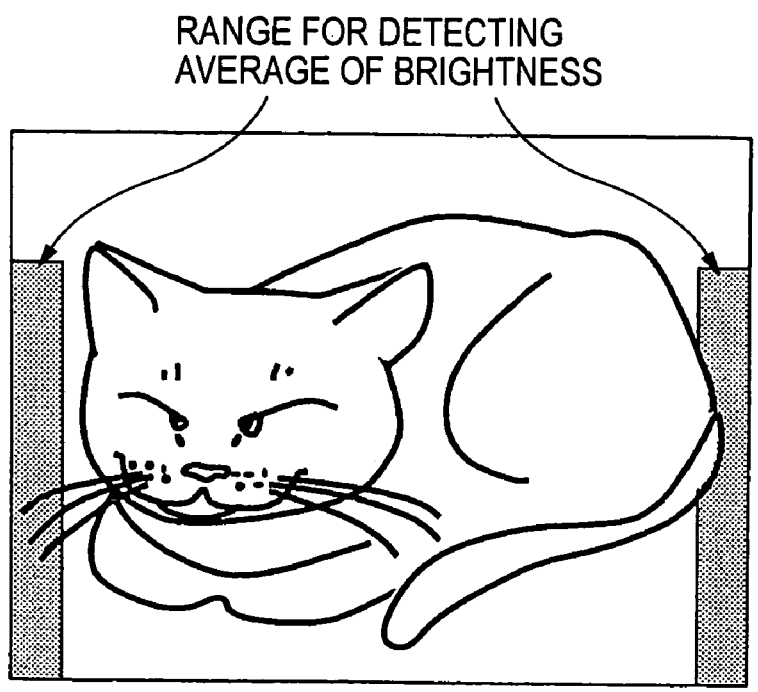
FIGS. 4A and 4B are views for explaining a process for adding the blank on both left and right sides of the input video.

In a case where the video output device 1 determines that the video in the predetermined range on both upper and lower sides is not uniform at step S3, the average of brightness in the predetermined range on both left and right sides of the input video is detected (S4). The range for detecting the average of brightness at step S4 is shown in FIG. 4A. As shown in FIG. 4A, an upper area of the video is not included in this range. A variety of information such as current time or a logo of the broadcasting station may be displayed in this area, and the precision of detecting the brightness for a main content of the video is improved by excluding this area.

Figure 4B:
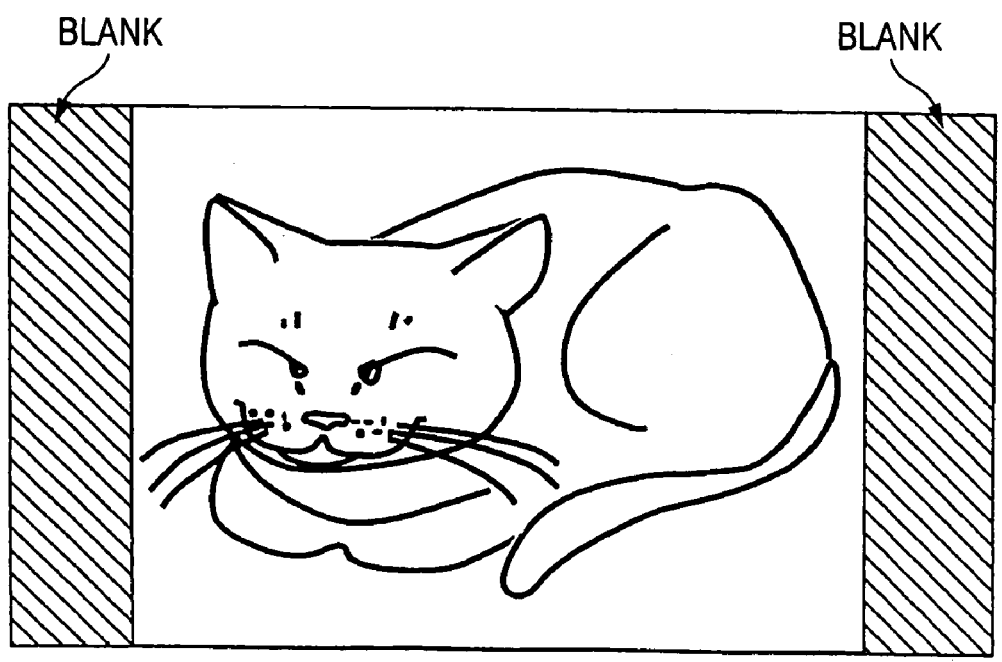

The video output device 1 determines the brightness of blank added on both left and right sides of the input video in accordance with the average of brightness detected at step S4 (S5), and produces the output video (see FIG. 4B) having an aspect ratio of 16/9 by adding the blank with determined brightness on both left and right sides of the input video (S6).

Figure 5:
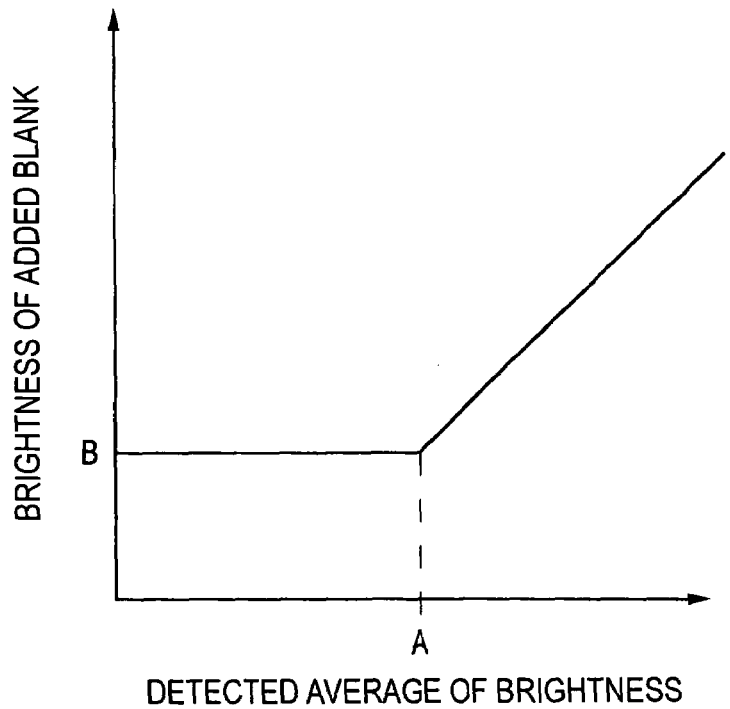
FIG. 5 is a graph for explaining a process for determining the brightness of blank to be added on both left and right sides of the input video.

Referring to FIG. 5, a process for determining the brightness at step S5 will be described below. The video output device 1 adjusts, as shown in FIG. 5, the brightness of the blank to be added to a value B so that the detected average of brightness reaches a preset value A, and adjusts the brightness of the blank to be added so that the difference from the detected average of brightness is equal to A if the detected average of brightness exceeds the preset value A. Accordingly, the difference between the brightness of blank to be added and the detected average of brightness does not exceed the value A.

The video output device 1 outputs the output video having an aspect ratio of 16/9 that is produced at step S6 (S9). Since the brightness of blank to be added to the input video is determined in accordance with the input video at step S5, the difference between the input video and the blank added at step S6 near the boundary is suppressed, whereby the displayed video is prevented from being distorted near the boundary.

Figure 6:
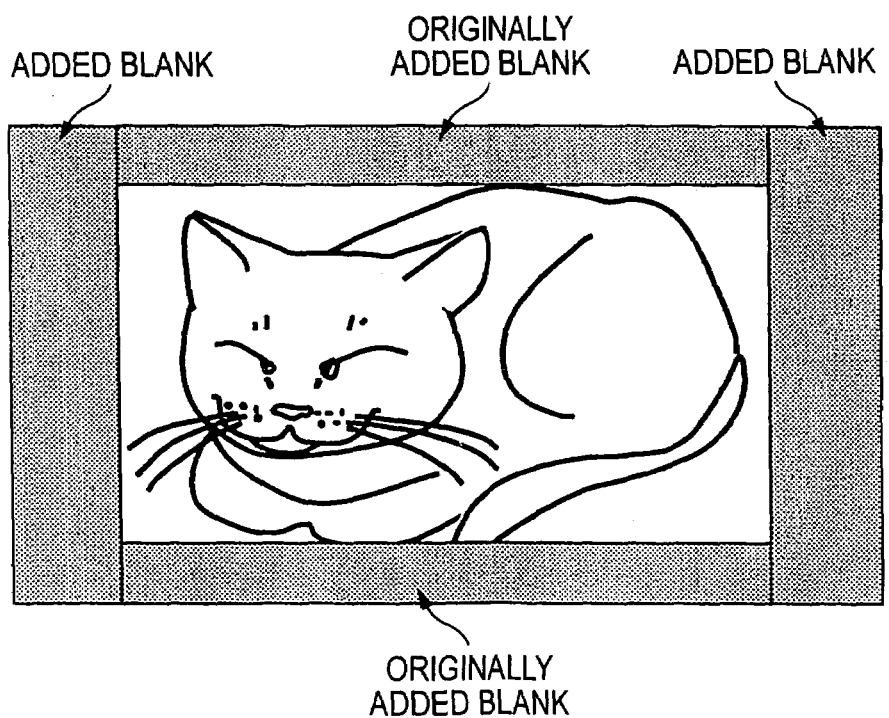
FIG. 6 is a view for explaining a process for adding the blank on both left and right sides of the input video.

Also, if it is determined that the video in the predetermined range on both upper and lower sides at step S3 is uniform (blank) (the video as shown in FIG. 3B), the video output device 1 adjusts the color and brightness of blank to be added on both left and right sides of the input video to be the color and brightness of blank added on both upper and lower sides of the input video (S7), and produces the output video (see FIG. 6) having an aspect ratio of 16/9 by adding the blank with the brightness on both left and right sides of the input video (S8).

The video output device 1 outputs the output video having the aspect ratio of 16/9 that is produced at step S8 (S9). Since the blank to be added to the input video is made the same brightness and color as the blank originally added to the input video at step S7, the natural video is displayed without two kinds of blank having different brightness and color in the displayed video.

Referring now to FIG. 7, the second mode will be described below. FIG. 7 is a flowchart showing the operation of the video output device when the second mode is selected.

As described above, it is supposed that the output unit 7 is connected to the display device with the display screen having an aspect ratio of 4/3.

The video output device 1 detects the aspect ratio of the input video input into the video input unit 3 in the aspect ratio detecting unit 4 (S11). The video output unit 1 determines whether the aspect ratio detected at step s11 is 4/3 or 16/9 (S12). If the video output unit 1 determines that the aspect ratio of the input video is 4/3 at step S12, this input video is output as the output video from the output unit 7 without intervention of the blank detecting unit 5 and the blank adding unit 6 (S20).

In the case where the input video is output without intervention of the blank detecting unit 5, the aspect ratio of the output video is 4/3 which is the same as that of the input video. Since the output unit 7 is connected to the display device in which the aspect ratio of the display screen is 4/3, the output video output from the output unit 7 is not expanded in the transverse direction or longitudinal direction in display. Therefore, there is no distortion in the displayed video. Also, even though the input video input into the video input unit 3 is the video with the blank added on both left and right sides or both upper and lower sides, the output video is not displayed expanded in the transverse or longitudinal direction, and there is no distortion in the displayed video.

Figure 8A:
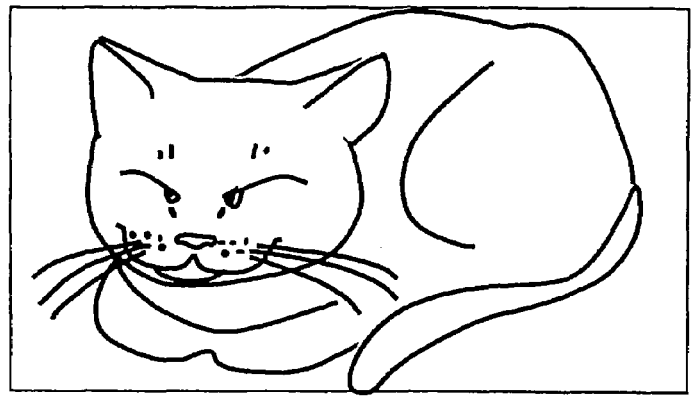
FIGS. 8A, 8B and 8C are views showing an example of the input video having an aspect ratio of 16/9.

On the other hand, if it is determined that the aspect ratio of the input video is 16/9 at step S12, the blank detecting unit 5 determines whether the input video is uniform in a predetermined range on both upper and lower sides of the input video and whether it is uniform in a predetermined area on both upper and lower sides (S13, S14). At steps S13 and S14, it is determined whether the input video is the video without the blank added on both left and right sides and on both upper and lower sides (see FIG. 8A), the video with the blank added on both left and right sides (see FIG. 8B), or the video with the blank added on both upper and lower sides (see FIG. 8C). That is, it is determined whether or not the input video is the video having an aspect ratio of 16/9 with the blank added on both left and right sides and on both upper and lower sides of the video having an aspect ratio of 4/3 or 2.35 to 1.

Figure 9A:
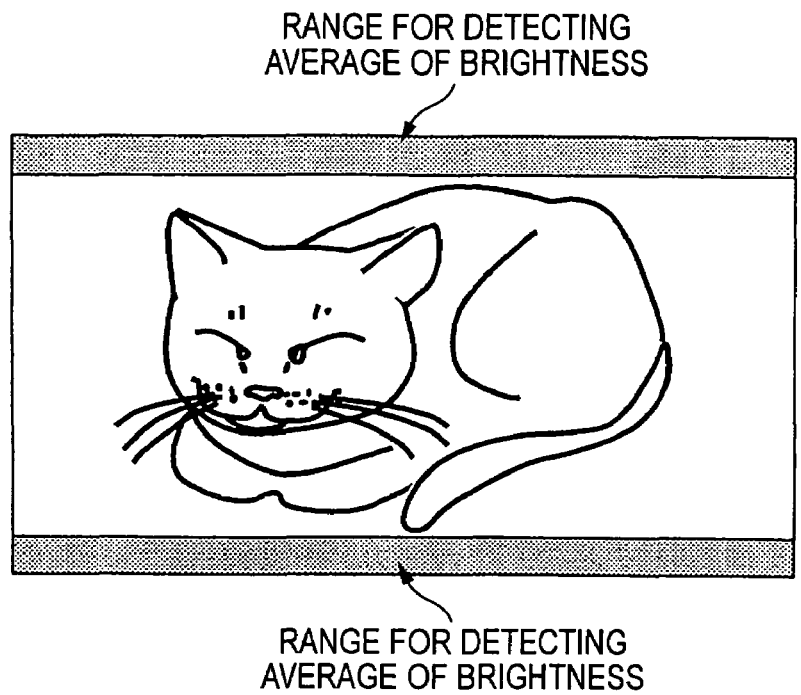
FIGS. 9A and 9B are views for explaining a process for adding the blank on both upper and lower sides of the input video.

If the video output device 1 determines that the video in the predetermined range on both upper and lower sides is not uniform (blank) at steps S13 and S14, the average of brightness in the predetermined range on both upper and lower sides of the input video is detected (S15). The range for detecting the average of brightness at step S15 is shown in FIG. 9A.

As described previously in the operation of the first mode, a variety of information such as a current time, a logo of the broadcasting station and so on may be displayed in an upper area of the video, and therefore, the precision of detecting the brightness for the video main body is improved by excluding the area. However, because the area where a variety of information such as a current time, a logo of the broadcasting station and the like is displayed is located slightly above the upper end of the video, the area where the information (a current time or a logo) is displayed is not included in the range for detecting the average of brightness at step S15, whereby the precision of detecting the brightness of the main content of the video is not degraded.

Figure 9B:
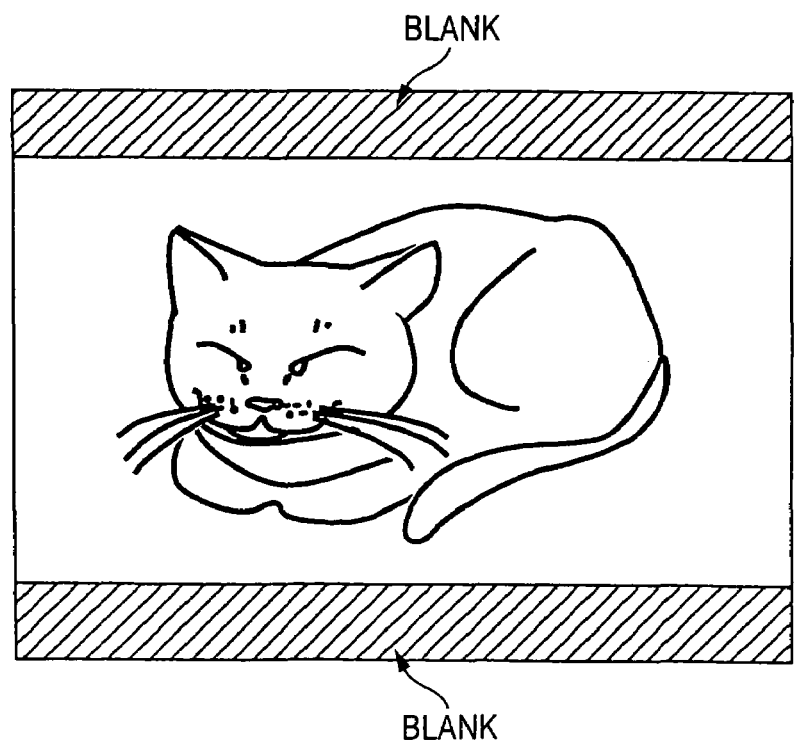

The video output device 1 determines the brightness of blank added on both upper and lower sides of the input video in accordance with the average of brightness detected at step S15 (S16), and produces the output video (see FIG. 9B) having an aspect ratio of 4/3 by adding the blank in determined brightness on both upper and lower sides of the input video (S17).

A process for determining the brightness at step S16 is the same as described at step S5.

The video output device 1 outputs the output video having the aspect ratio of 4/3 that is produced at step S17 (S20). Since the brightness of blank to be added to the input video is determined in accordance with the input video at step S16, the difference between the input video and the blank added at step S17 near the boundary is suppressed, whereby the displayed video is prevented from being distorted near the boundary.

Figure 8B:
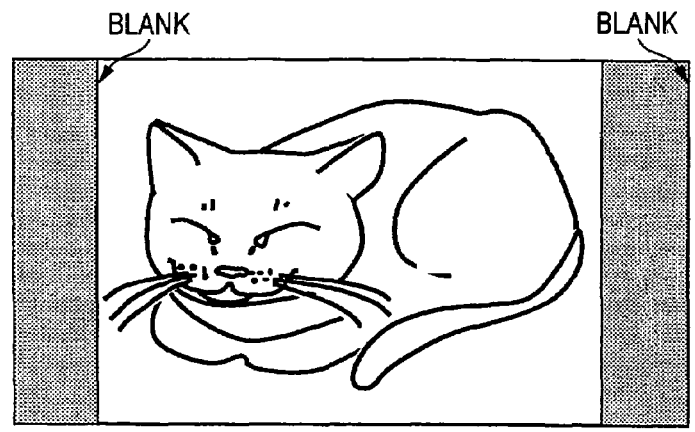
Figure 8C:
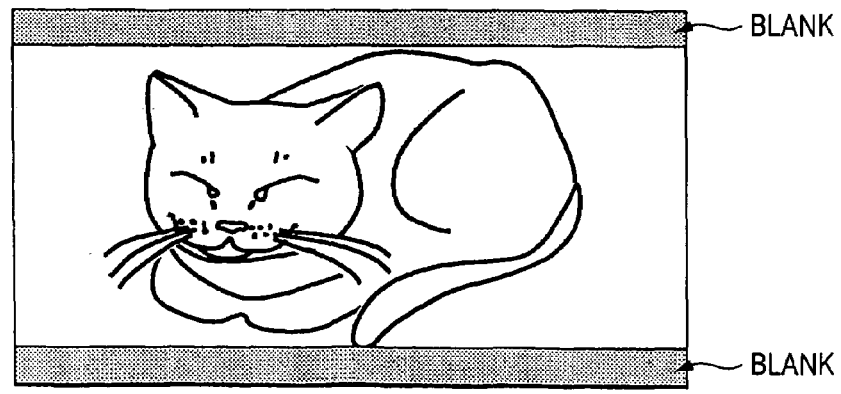
Figure 10:
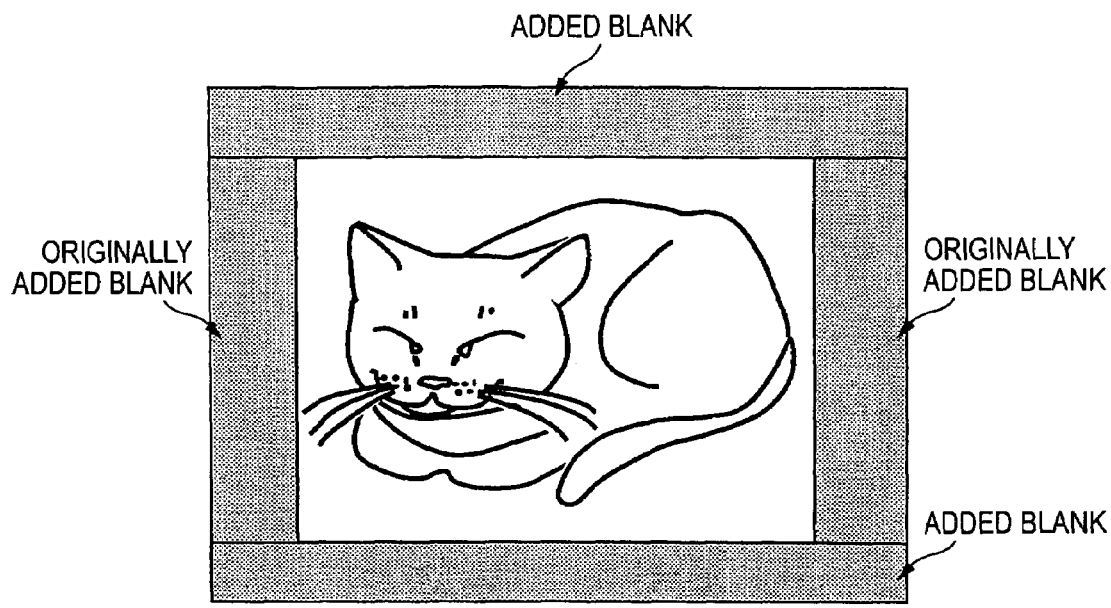
FIG. 10 is a view for explaining a process for adding the blank on both upper and lower sides of the input video.
Figure 11:
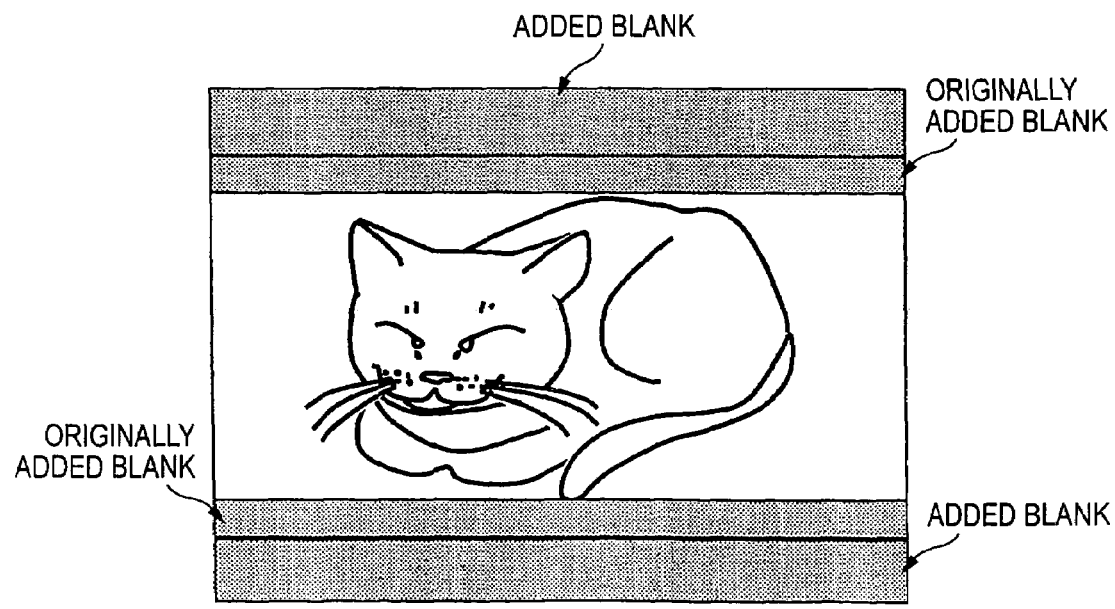
FIG. 11 is a view for explaining a process for adding the blank on both upper and lower sides of the input video.

Also, if it is determined that the video in the predetermined range on both left and right sides at step S13 is uniform (blank) (the video as shown in FIG. 8B), or it is determined that the video in the predetermined range on both upper and lower sides at step S14 is uniform (blank) (the video as shown in FIG. 8C), the video output device 1 adjusts the color and brightness of blank to be added on both left and right sides of the input video to be the color and brightness of blank added on both left and right sides or on both upper and lower sides of the input video (S18), and produces the output video (see FIGS. 10 and 11) having an aspect ratio of 4/3 by adding the blank in the brightness on both upper and lower sides of the input video (S19).

The video output device 1 outputs the output video having the aspect ratio of 4/3 that is produced at step S19 (S20). Since the blank to be added to the input video is made the same brightness and color as the blank originally added to the input video at step S18, the natural video is displayed without two kinds of blank having different brightness and color in the displayed video.

As described above, the video output device 1 according to the embodiment displays the natural video without distortion, irrespective of the aspect ratio of the input video, and the aspect ratio of the display screen in the display device for displaying the input video.

As described above, when the blank is added on both left and right sides of the input video having an aspect ratio of 4/3, a difference in brightness near the boundary between the blank and the video is suppressed, whereby the video is displayed without causing a distortion near the boundary between the blank and the video on the display screen having an aspect ratio of 16/9 in the display device.

Also, when the blank is added on both upper and lower sides of the input video having an aspect ratio of 16/9, a difference in brightness near the boundary between the blank and the video is suppressed, whereby the video is displayed without causing a distortion near the boundary between the blank and the video on the display screen having an aspect ratio of 4/3 in the display device.

Further, when the input vide has the blank originally added, the blank is added with the same brightness and color as the originally added blank, whereby the natural video is displayed without causing the viewer to have a sense of incompatibility.

As described above, in the present invention, the aspect ratio detecting unit detects the aspect ratio of the video (input video), and the blank adding unit adds the blank on both left and right sides of the input video to produce the video (output video) having an aspect ratio of 16/9, if the aspect ratio detected here is 4/3. The output unit outputs the output video having an aspect ratio of 16/9 produced by the blank adding unit.

When the aspect ratio of the input video is 16/9, the input video may be directly output.

Accordingly, when the display screen for displaying the video output from the output means has an aspect ratio of 16/9, the distorted video is not displayed by being expanded in the transverse direction, even if the aspect ratio of the input video is 4/3.

Also, the blank adding unit adjusts the brightness of the blank added on the input video in accordance with the brightness in the predetermined range on both left and right sides of the input video detected by the brightness detecting unit. For example, the brightness of the blank added on the input video is adjusted so that a difference in brightness near the boundary between the input video and the added blank may not exceed a predetermined value. Accordingly, when the blank is added to the input video, the difference in brightness near the boundary between the input video and the blank is suppressed, whereby it is possible to prevent the video from being distorted near the boundary.

According to the present invention, the blank adding unit adds the blank on both upper and lower sides of the input video to produce the output video having an aspect ratio of 4/3, if the aspect ratio of the input video detected by the aspect ratio detecting unit is 16/9. The output unit outputs the output video having an aspect ratio of 4/3 produced by the blank adding unit.

When the aspect ratio of the input video is 4/3, the input video may be directly output.

Accordingly, when the display screen for displaying the video output from the output unit has an aspect ratio of 4/3, the distorted video is not displayed by being expanded in the longitudinal direction, even if the aspect ratio of the input video is 16/9.

Also, the blank adding unit adjusts the brightness of the blank added on the input video in accordance with the brightness in the predetermined range on both upper and lower sides of the input video detected by the brightness detecting unit. For example, the brightness of the blank added on the input video is adjusted so that a difference in brightness near the boundary between the input video and the added blank may not exceed a predetermined value. Accordingly, when the blank is added to the input video, the difference in brightness near the boundary between the input video and the blank is suppressed, whereby it is possible to prevent the video from being distorted near the boundary.

According to the present invention, if the input video in the predetermined range on both left and right sides or in the predetermined range on both upper and lower sides is uniform video, or the blank, the blank brightness adjusting unit adjusts the brightness and color of the added blank in accordance with this uniform video.

For example, when the input video is the video having an aspect ratio of 16/9 by adding the blank on both left and right sides of the video having an aspect ratio of 4/3, the video having an aspect ratio of 16/9 by adding the blank on both upper and lower sides of the video having an aspect ratio of 2.35/1 (video of so-called Cinemascope size), or the video having an aspect ratio of 4/3 by adding the blank on both upper and lower sides of the video having an aspect ratio of 16/9, the natural video is displayed by adding the blank having the same brightness and color as the blank originally added on the input video without causing the viewer to have a sense of incompatibility.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A video output device comprising:
    an aspect ratio detecting unit configured to detect an aspect ratio of a input video;
    a first blank adding unit configured to add a blank on both left and right sides of the video to produce a video having an aspect ratio of 16/9, in a case where the aspect ratio detected by the aspect ratio detecting unit is 4/3;
    a second blank adding unit configured to add a blank on both upper and lower sides of the video to produce a video having an aspect ratio of 4/3, in a case where the aspect ratio detected by the aspect ratio detecting unit is 16/9;
    a setting unit configured to enable one of the first and the second blank adding units and to disable the other;
    an output unit configured to output the video having a changed aspect ratio produced by either one of the first and the second blank adding units enabled by the setting unit;
    a blank video detecting unit configured to detect whether or not a predetermined range on both left and right sides of the input video is uniform, and to detect whether or not a predetermined range on both upper and lower sides of the input video is uniform; and
    a brightness detecting unit configured to detect a brightness of a predetermined range on both left and right sides of the input video, and to detect a brightness of a predetermined range on both upper and lower sides of the input video,
    wherein when the blank video detecting unit detects that the predetermined range of the input video on both left and right sides, or on both upper and lower sides, is uniform, the first and the second blank adding unit adjust a brightness and a color of the blank to be added so as to coincide with the brightness and a color of the predetermined range of the input video, and
    wherein when the blank video detecting unit detects that the predetermined range of the input video on both left and right sides, and on both upper and lower sides, is not uniform, the first blank adding unit adjusts the brightness of the blank to be added in accordance with the brightness of the predetermined range of the input video on both left and right sides, and the second blank adding unit adjusts the brightness of the blank to be added in accordance with the brightness of the predetermined range of the input video on both upper and lower sides.

2. A video output device comprising:
    an aspect ratio detecting unit configured to detect an aspect ratio of a input video;
    a blank adding unit configured to add a blank on both left and right sides of the video to produce a video having an aspect ratio of 16/9, in a case where the aspect ratio detected by the aspect ratio detecting unit is 4/3;
    an output unit configured to output the video having the aspect ratio of 16/9 in which produced by the blank adding unit;
    a brightness detecting unit configured to detect a brightness of a predetermined range on both left and right sides of the input video, and
    a blank video detecting unit configured to detect whether or not a predetermined range on both left and right sides of the input video is uniform,
    wherein the blank adding unit adjusts a brightness of the blank to be added in accordance with the brightness detected by the brightness detecting unit, and
    wherein when the blank video detecting unit detects that the predetermined range of the input video on both left and right sides is uniform, the blank adding unit adjusts the brightness and a color of the blank to be added in accordance with the brightness and a color of the predetermined range of the input video.

3. The video output device as claimed in claim 2, wherein when the blank video detecting unit detects that the predetermined range of the input video on both left and right sides is uniform, the blank adding unit adjust the brightness and a color of the blank to be added so as to coincide with the brightness and a color of the predetermined range of the input video.

4. A video output device comprising:
    an aspect ratio detecting unit configured to detect an aspect ratio of an input video;
    a blank adding unit configured to add a blank on both upper and lower sides of the video to produce a video having an aspect ratio of 4/3, in a case where the aspect ratio detected by the aspect ratio detecting unit is 16/9;
    an output unit configured to output the video having the aspect ratio of 4/3 which is produced by the blank adding unit;

a brightness detecting unit configured to detect a brightness of a predetermined range on both upper and lower sides of the input video, and a blank video detecting unit configured to detect whether or not a predetermined range on both upper and lower sides of the input video is uniform, wherein the blank adding unit adjusts a brightness of the blank to be added in accordance with the brightness detected by the brightness detecting unit; and wherein when the blank video detecting unit detects that the predetermined range of the input video on both upper and lower sides is uniform, the blank adding unit adjusts the brightness and a color of the blank to be added in accordance with the brightness and a color of the predetermined range of the input video.

5. The video output device as claimed in claim 4, wherein when the blank video detecting unit detects that the predetermined range of the input video on both upper and lower sides is uniform, the blank adding unit adjusts the brightness and a color of the blank to be added so as to coincide with the brightness and a color of the predetermined range of the input video.

* * * * *